United States Patent [19]

Shuler et al.

[11] 4,356,738
[45] Nov. 2, 1982

[54] CONTROL ARRANGEMENT WITH SNUBBER MEANS

[75] Inventors: Lucien B. Shuler, Bettendorf, Iowa; William J. Spivey, Jr., Joliet, Ill.

[73] Assignee: Caterpillar Tractor Co., Peoria, Ill.

[21] Appl. No.: 198,407

[22] Filed: Oct. 20, 1980

Related U.S. Application Data

[62] Division of Ser. No. 89,321, Jun. 13, 1979, abandoned.

[51] Int. Cl.³ .......................... G05G 1/04; G05G 9/08
[52] U.S. Cl. .................................... 74/470; 74/473 R
[58] Field of Search ..................... 74/526, 470, 522.5

[56] References Cited

U.S. PATENT DOCUMENTS 2,439,356 4/1948 Arens ..................................... 74/470

4,078,449 3/1978 Kelly ..................................... 74/526

FOREIGN PATENT DOCUMENTS

923186 1/1946 France ................................. 74/470

*Primary Examiner*—Kenneth Dorner
*Attorney, Agent, or Firm*—Paul S. Lempio

[57] ABSTRACT

A control arrangement comprises a pivotal control member having a pair of arms and a pivotal lever disposed between the arms. The stop member is secured on the lever to engage a snubber upon relative pivoting between the control member and lever. The control arrangement is adapted for connection to a control valve to alert the operator when the control lever has over-travelled a "run" condition of operation when the stop member engages the snubber.

3 Claims, 6 Drawing Figures

CONTROL ARRANGEMENT WITH SNUBBER MEANS

This is a division of Ser. No. 89,321, filed June 13, 1979 abandoned.

DESCRIPTION

1. Technical Field

This invention relates to a hydraulic circuit for controlling and preconditioning the operation of a hydrostatic transmission or the like.

2. Background Art

Variable displacement pumps of the type employed in hydrostatic transmissions are adapted to have the displacements thereof varied between minimum and maximum levels upon adjustment of servo-systems operatively connected to the pumps for actuating swash plates thereof in a conventional manner. The control circuit therefor may comprise an underspeed actuator which is connected to the servo-systems and further connected to a venturi to receive a differential fluid pressure signal therefrom which is proportional to the speed of a vehicle's engine to control automatically the underspeed actuator and thus the displacement of the pumps under certain operating conditions of the engine.

U.S. Pat. No. 3,952,514, assigned to the assignee of this application, and issued to Cyril W. Habiger on December 27, 1976, discloses a conventional control circuit of this type. This control circuit further comprises a direct speed control and vent valve having a spool thereof sequentially movable from a "vent" position whereby the control circuit is deactivated with the vehicle brakes being retained in their normally "on" condition of operation, a "zero" speed condition whereby the control circuit is preconditioned for operation and then to a "run" position whereby the brakes are released and the control circuit is activated.

When the spool is moved to its "zero" speed position, pressurized fluid is communicated to a second spool to move it to a position whereby brakes may be released and pressurized fluid may be communicated to a replenishing and relief valve of the control circuit. Should the operator move the first-mentioned spool too fast, the preconditioning of the brakes for release thereof and further preconditioning of the replenishing and relief valve may not occur. Furthermore, control circuits of this type are somewhat complex and require very close calibration for efficient operation of the control circuit and its associated hydrostatic transmission.

DISCLOSURE OF THE INVENTION

The present invention is directed to overcoming one or more of the problems as set forth above.

This invention is drawn to a control arrangement comprising a pivotal control member having a pair of arms, a pivotal lever disposed between the arms, a stop member secured on the lever, and snubber means for resiliently engaging the stop member upon relative pivoting between the control member and the lever. The snubber means includes a reciprocal pin and biasing means for biasing the pin toward the stop member.

The control arrangement is adapted for connection to a control valve of a hydraulic control circuit, whereby the engagement between the snubber means and stop member will alert an operator that the control lever has overtravelled the "run" condition of operation.

BRIEF DESCRIPTION OF THE DRAWINGS

Other objects of this invention will become apparent from the following description and accompanying drawings wherein:

FIG. 1 schematically illustrates a control circuit embodiment of the present invention with portions thereof broken-away for clarification purposes;

BEST MODE OF CARRYING OUT THE INVENTION

General Description

FIG. 1 illustrates a control circuit comprising a source of pressurized fluid 10, preferably including an engine-driven positive displacement pump 11 adapted to charge a line 12 of the circuit with pressurized fluid (hydraulic) from a common reservoir or tank 13. A control lever 14 is arranged to be moved in a V-shaped slot 15 by an operator of a vehicle to move a two-position vent control valve 16 in a "vent" or "run" position of operation. As more fully described hereinafter, although valve 16 is, in fact, movable to three distinct positions (FIG. 3), since two of these positions are functionally identical, valve 16 may be considered as having two (functional) positions.

Valve 16 is connected to a control and preconditioning valve means 17 to function therewith to selectively control the operation and displacement of an engine-driven, variable displacement pump 18 of a fluid actuating means 19. In the illustrated embodiment, actuating means 19 is described as comprising a servo-system 20 for pump 18, a replenishing and relief valve 21 and a hydrostatic transmission 23, which includes pump 18 and a motor 22. The transmission package further includes a closed loop 24, interconnected between pump 18 and motor 22 in a conventional manner, as more fully described in above-referenced U.S. Pat. No. 3,952,514.

Figure 2:
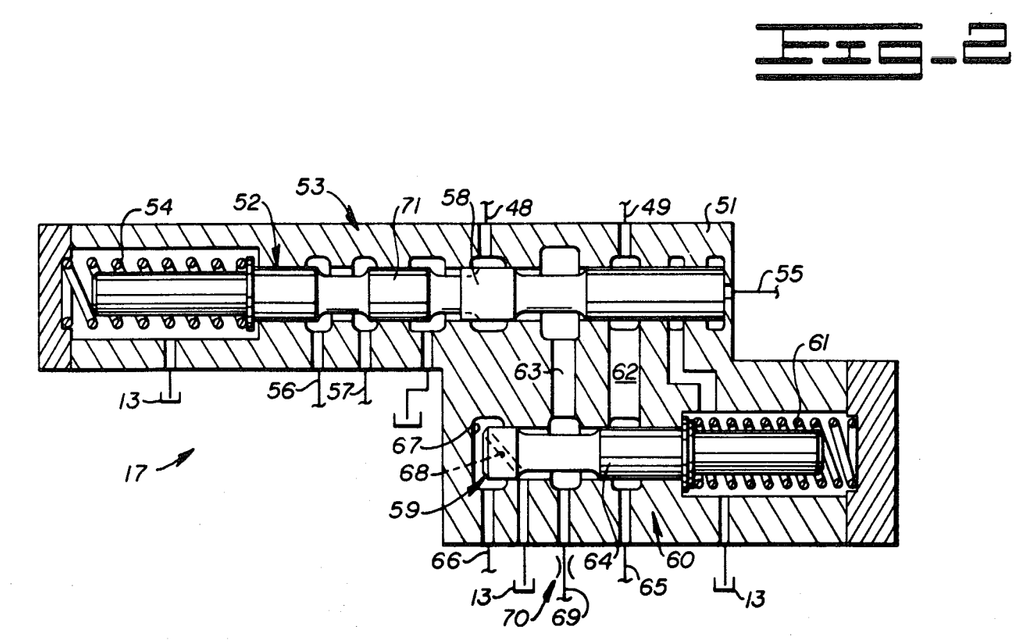
FIG. 2 is a sectional view illustrating a control and preconditioning valve employed in the control circuit.
Figure 2A:
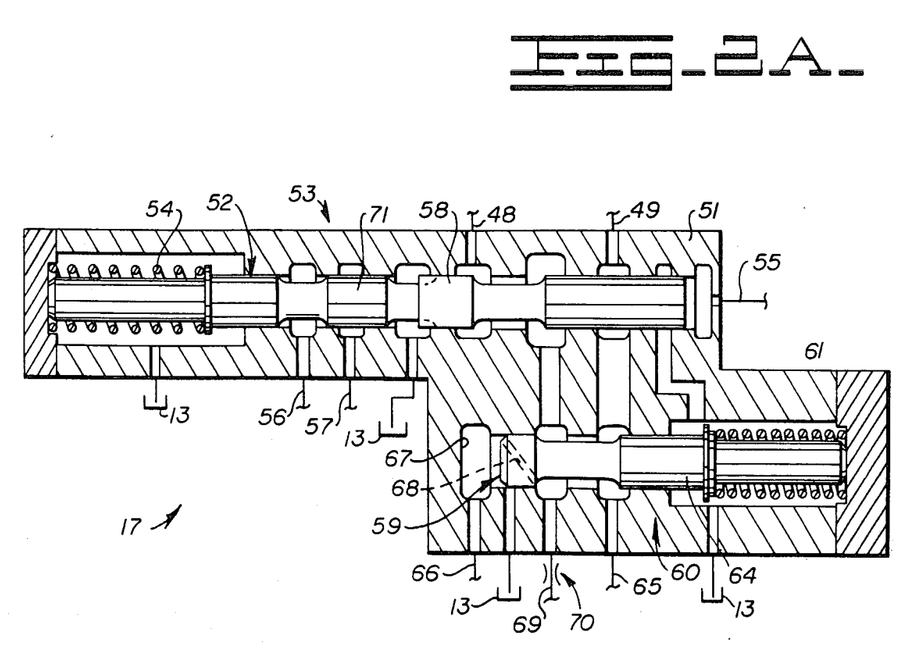
FIGS. 2A and 2B are views similar to FIG. 2, but illustrating the control and preconditioning valve in sequential stages of operation.
Figure 2B:
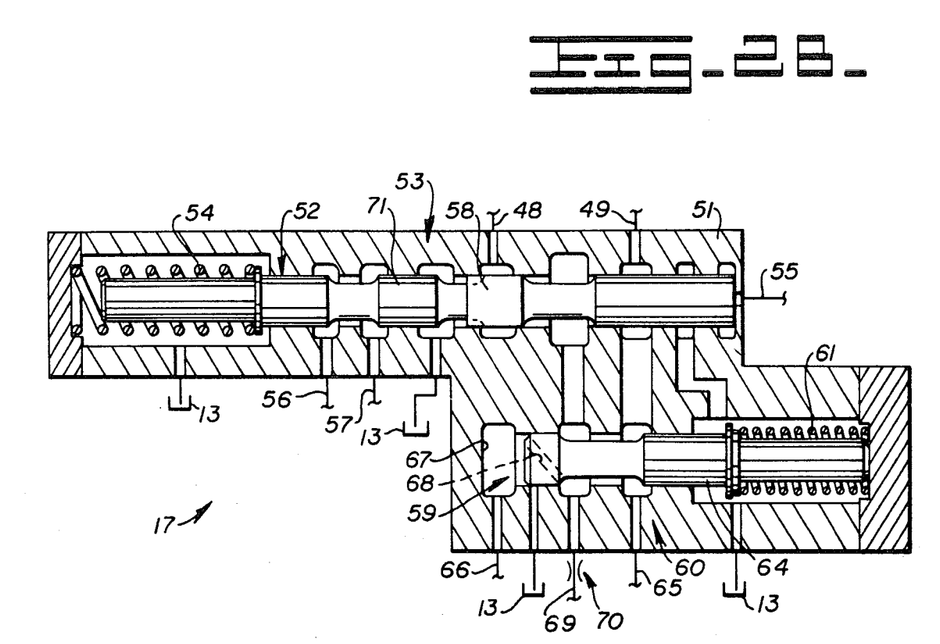
Figures 3, 4:
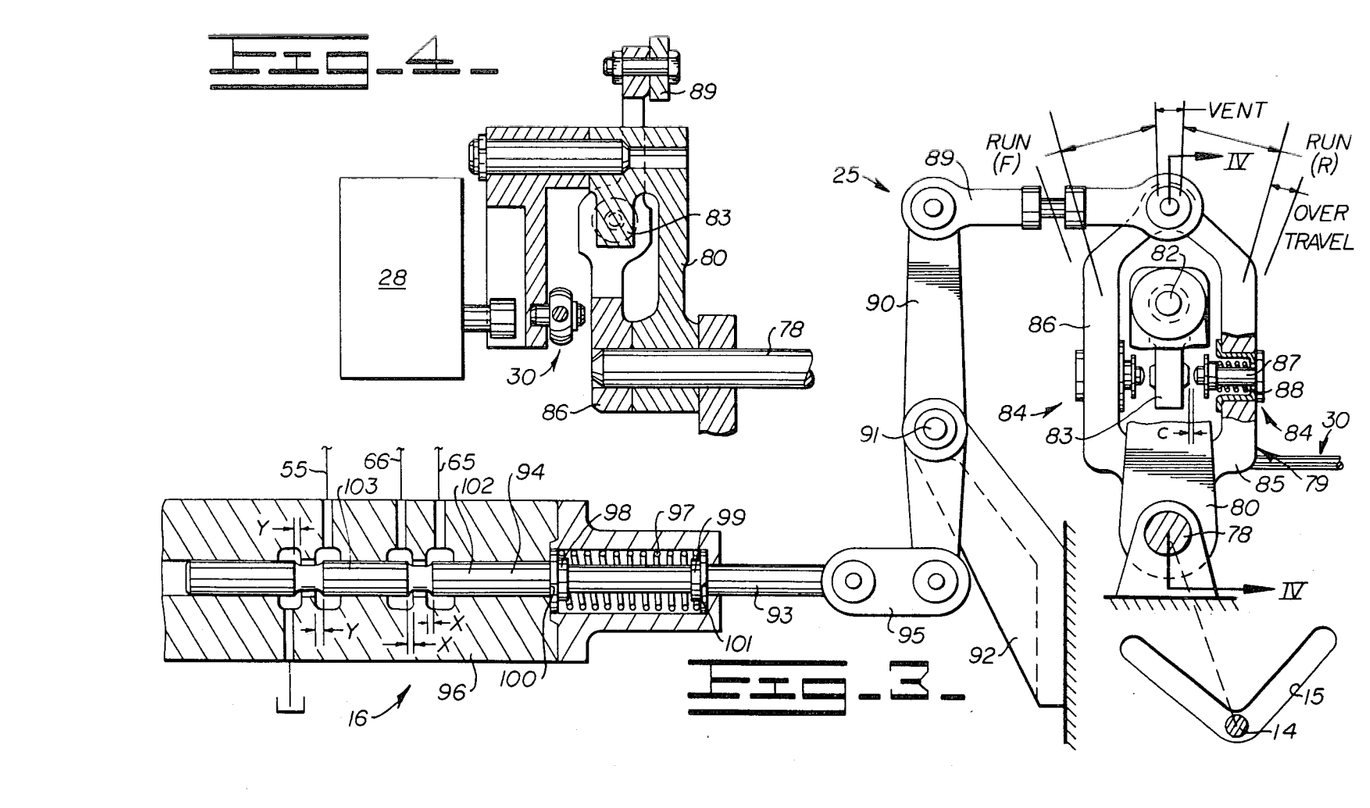
FIG. 3 illustrates an operator control arrangement associated with a vent control valve of the control circuit.
FIG. 4 is a sectional view through the operator control arrangement, taken in the direction of arrows IV—IV in FIG. 3.

In general, when the engine is running with vent control lever 14 maintained in its "vent" (V) position to thus maintain vent control valve 16 in its first position illustrated in FIGS. 1 and 3, control and preconditioning valve means 17 will be readied for operation, as shown in FIG. 2A. As described more fully hereinafter, control lever 14 must be moved to its "vent" position upon or after starting of the vehicle, i.e., the control circuit cannot be activated and the associated vehicle moved when the engine is started with control lever 14 in one of its "run" (R) positions. Shifting of control lever 14 to one of its "run" positions (forward or reverse) from its "vent" position will function to communicate pressurized fluid from source 10, through control and preconditioning valve means 17 (FIG. 2B), to replenishing and relief valve 21 to activate transmission 23, and also to normally "on" brakes 26 to release the same.

Control lever 14 is connected, as schematically illustrated at 27, to a standard underspeed actuator 28. The position of piston 29 of actuator 28 will determine the displacement of pump 18, via a linkage 30 interconnected between servo-system 20 and underspeed actuator 28, between minimum ("full underspeed") and maximum ("zero underspeed") levels. The position of piston 29 of the underspeed actuator, and thus the displacement of pump 18, is responsive to a fluid pressure differential or signal created across a venturi 31 and which is communicated to either end of piston 29, the pressure differential being proportional to the speed of pump 11 and the engine.

Should the operator desire to override such fluid pressure signal, he need only depress a pedal 32 suitably connected to an override or pilot means 33. Depression of the pedal will generally function to vary the fluid pressure signal in a closely controlled manner to selectively reposition piston 29 of underspeed actuator 28 whereby the displacement of pump 18 can be changed for certain operating conditions of the vehicle. As more fully described hereinafter, release of override pedal 32 will not affect the prior setting of speed control lever 14, associated vent control valve 16, nor control and preconditioning valve means 17 whereby underspeed actuator 28 will be permitted to resume normal operation.

As suggested above, control lever 14 must be initially placed in its "vent" position illustrated in FIGS. 1 and 3 upon or after starting of the engine to assume or resume normal operation of the vehicle, e.g., brakes 26 will not be released and the vehicle cannot be moved should the engine be started with control lever 14 maintained in one of its "run" positions. Furthermore, once the engine has been started with control lever 14 in its "vent" position, control and preconditioning valve means 17 will continuously remain in a preconditioned state of operation (FIG. 2A or 2B) whereby no special resetting of the control lever will be required.

DETAILED DESCRIPTION

Referring to FIG. 1, the communication of pressurized fluid to venturi 31 from pump 11 will create a pressure differential or signal between a line 34, connected to an up-stream side of venturi 31, and a line 35 which is connected to a throat portion of venturi 31, via a restricted orifice 35a. This differential pressure will be communicated to opposite ends of piston 29 of underspeed actuator 28, via lines 36 and 37, the latter line being connected to line 34 through a quick response or shunt valve 38. Underspeed actuator 28 will function in a conventional manner during normal engine operation to regulate servo-system 20 of actuating means 19 for controlling the displacement of pump 18.

Shunt valve 38 essentially functions to interconnect lines 34 and 37 for fluid flow therebetween and is adapted to open to communicate line 37 with lines 35 and 36 when piston 29 of underspeed actuator 28 moves downwardly quickly to create a pressure surge in line 37. A pressure regulating valve 39 is connected in a line 40, connected to a downstream side of venturi 31, to supply pressurized fluid at a predetermined level to one side of replenishing and relief valve 21, via a line 41. A line 42 is interconnected between line 40 and servo-system 20 to communicate pressurized fluid at a predetermined level to the servo-system in a conventional manner.

The control circuit preferably comprises a by-pass arrangement 43, including a line 44 having an adjustable orifice 45 connected therein. By-pass arrangement 43 is connected across venturi 31 to closely control and finely tune the differential pressure drop across the venturi and the fluid pressure signal communicated to underspeed actuator 28, as described above. This fine tuning may be utilized to compensate for manufacturing variances and the like in venturi 31, the various pumps, etc.

A pressure relief valve 46 is connected in line 41 to ensure that replenishing and relief valve 21 is charged in a conventional manner with a predetermined level of pressurized fluid. In addition to supplying fluid pressure to hydrostatic loop 24 of transmission 23, valve 21 further communicates with a line 47 which connects with actuating chambers (not shown) of brakes 26 of the vehicle. When the actuating chambers of brakes 26 are vented, springs (not shown) thereof hold the brakes in their "on" or engaged condition of operation and the brakes are released when pressurized fluid is communicated to such chambers via a line 48, a check valve 50 and line 47. Communication of pressurized fluid to line 47 will also charge replenishing and relief valve 21 to activate hydrostatic transmission 23 for operation by the operator.

Line 41 is further connected to a line 49, through a check valve 50, to communicate pressurized fluid to control and preconditioning valve means 17. In the vent positions of control lever 14 and vent control valve 16 (also termed "first valve means" herein), control and preconditioning valve means 17 is conditioned to prevent communication of pressurized fluid from line 49 to line 48 and thus to replenishing and relief valve 21 and brakes 26.

CONTROL AND PRECONDITIONING VALVE 17

Referring to FIGS. 1 and 2 in conjunction, control and preconditioning valve means 17 comprises a housing 51 having a spool 52 of a flow control valve or second valve means 53 reciprocally mounted therein. Spool 52 is biased rightwardly towards its illustrated first and closed position by a compression coil spring 54 and is adapted to be moved leftwardly against the force of the spring when pressurized fluid is communicated to the right end thereof via a line 55. In its first position illustrated in FIG. 2, second valve means 53 is positioned to connect a pair of lines 56 and 57 which are further connected to opposite ends of underspeed actuator 28 (FIG. 1) to thus deactivate the same.

During this first position of second valve means 53, a land 58 of spool 52 is positioned to block communication of pressurized fluid to outlet line 48. It should be further noted in FIG. 2 (and assuming that the engine is not running) that a spool 59 of a preconditioning valve or third valve means 60 of valve means 17 is urged to its illustrated first, closed position by a compression coil spring 61 to block communication between a pair of passages 62 and 63, defined in housing 51, at a land 64 thereof. Spool 59 will remain in this blocking position when the engine is not running and also when an attempt is made to start the engine with control lever 14 (FIG. 1) in one of its "run" positions. Accordingly, pump pressure cannot be communicated to second valve means 53 from passage 62.

However, with the engine running and with control lever 14 and first valve means 16 being initially positioned in their "vent" positions shown in FIG. 1, third valve means 60 will move to its second, open position, illustrated in FIG. 2A. In particular, pressurized fluid in line 49 will flow through passage 62, a line 65, first valve means 16, and into a line 66. Line 66 communicates with an actuating chamber 67, defined in housing 51 at the left end of spool 59, to thus pressurize the chamber to move spool 59 rightwardly. A restricted passage 68 is formed through the left end of spool 59 to ensure that chamber 67 is drained to tank 13 when the engine has been shut-down, and to further ensure that sufficient fluid pressure remains in chamber 67, when control lever 14 is subsequently shifted to a "run" position, to maintain second valve means in its second position (FIG. 2B).

Thus, pressurization of chamber 67 will shift spool 59 rightwardly against the opposed biasing force of spring 61 to move restricted passage 68 out of communication with tank 13 and to open commnication between passages 62 and 63 and to also communicate passage 62 with chamber 67, via passage 68, as shown in FIG. 2A. The control circuit is now preconditioned to continuously maintain valve means 60 in its second position illustrated in FIGS. 2A and 2B, so long as the engine remains running. It should be noted that prior to this preconditioning of third valve means 60 (FIG. 2), that a line 69, having a restricted orifice 70 therein, is vented to tank 13 along with passage 63. It should be further noted that upon shifting of spool 59 to its position illustrated in FIG. 2A, that land 64 will be repositioned to communicate passage 62 with passage 63 and will continue to communicate passage 62 with vented line 64 (through valve 16 in FIG. 1).

Assuming now that the control circuit has been preconditioned in the manner described above and that the operator now shifts control lever 14 (FIG. 1) from its "vent" position to one of its illustrated "run" positions, first valve means 16 will shift rightwardly to its second position in response thereto. First valve means 16 will thus block communication of line 55 with drain 13 and will also block communication of line 65 with line 66. However, since spool 59 of third valve means 60 has been shifted to its second position illustrated in FIGS. 2A and 2B, pressurized fluid in passage 62 will continuously flow into chamber 67, via restricted passage 68, to retain spool 59 in this position.

Simultaneously therewith, pressurized fluid from line 69 will communicate with the right end of second valve means 53, via line 55, to shift spool 52 thereof leftwardly to its FIG. 2B second position. Such shifting of spool 52 will place a land 71 thereof in blocking relationship between lines 56 and 57 to permit underspeed actuator 28 (FIG. 1) to perform its normal function and will also move land 58 to a non-blocking position to permit communication of passage 63 with line 48. Pressurized fluid is thus communicated to brakes 26 to release them and also to replenishing and relief valve 21 to activate the control circuit for operation of hydrostatic transmission 23.

Override Means 33

Referring once again to FIG. 1, when the control circuit is maintained in its "run" condition of operation, the automatic operation of underspeed actuator 28 may be overridden by depressing override pedal 32. Depression of the pedal through band "a" will rotate (or slide, depending on the preferred construction) a valve spool 72 of override or pilot means 33 to open a normally closed first variable orifice 73 and to retain a second variable orifice 74 in its closed condition of operation. Thus, the operator may selectively alter the speed of the vehicle by shunting the differential fluid pressure, as between a pair of lines 75 and 76 which connect with lines 36 and 37, respectively. The control and gradual change of such differential fluid pressure will directly affect the positioning of servo-system 20 for pump 18.

Upon release of pedal 32, orifice 73 will again close and the control circuit will return to its normal operation, as previously established by the particular positioning of control lever 14. So long as override pedal 32 is only moved through band "a", valve spool 52 of second valve means 53 will remain in its FIG. 2B position, under the force of pressurized fluid communicated to the right end thereof by line 55.

However, should the operator desire to stop the vehicle during the override phase of vehicle operation, he need only depress pedal 32 into band "b" in FIG. 1 whereby a second variable orifice 74 of override means 33 will open to vent a line 77, connected to line 55, to tank 13. Such venting will permit valve spool 52 to move back to its first position illustrated in FIG. 2A whereby land 58 will block communication of passage 63 with line 48 and also permit line 48 to vent to tank 13. However, spool 59 of third valve means 60 will remain in its second operational position illustrated in FIG. 2A, since chamber 67 will remain pressurized via passage 68.

Operator Control Arrangement 25

FIGS. 3 and 4 illustrate a preferred embodiment of operator control arrangement 25 which interconnects control lever 14 with vent control valve or first valve means 16. Operator control arrangement 25 comprises a rock shaft 78 which has a bifurcated control member 79 secured thereon, the control member being mechanically connected to control lever 14 in a conventional manner. Thus, pivoting of control member 79 in either direction, depending upon the particular "run" position (either forward or reverse) of control lever 14 in slot 15, will selectively actuate vent control valve 16. Linkage means 27 comprises a lever 80 pivotally mounted on shaft 78, a pin 82 is secured to an upper end of lever 80 and a stop member 83, also secured to the lever.

Assuming that the operator pivots control member 79 into one of the "run" ranges illustrated in FIG. 3, stop member 83 will engage a respective one of a pair of spring-loaded snubber means 84, mounted on arms 85 and 86 of control member 79. The operator will thereafter "feel" when control lever 14 and mechanically associated control member 79 have passed through the "run" range and have reached their "over-travel" positions, with servo-system 20 having placed pump 18 in its condition for maximum displacement, when snubber means 84 "bottoms out" on control member 79. Each snubber means 84 may comprise a pin member 87 reciprocally mounted on arm 85, for example, and biased towards stop member 83 by a biasing means, shown in the form of coil spring 88.

A link 89 is pivotally interconnected between an upper end of control member 79 and an upper end of a bellcrank 90 which is pivoted by a pin 91 on a stationary bracket 92. A lower end of bellcrank 90 is pivotally connected to an end extension 93 of a spool 94 of first valve means 16, by a link 95. Spool 94 is reciprocally mounted in a housing 96 and is normally maintained in its illustrated first or vent position by a self-centering compression coil spring 97. A pair of washers 98 and 99 are slidably mounted on spool extension 93 to normally abut a pair of shoulders 100 and 101, respectively, formed on the extension.

As mentioned above, although valve 16 is movable to three distinct positions in FIG. 3, i.e., the illustrated first or vent position, and positions on either side thereof whereby lines 55, 65, and 66 are all blocked, the latter two positions are functionally identical and may be considered collectively as constituting the "second position" of valve 16 for explanation purposes herein.

It should be further noted that operator control arrangement 25 is suitably calibrated and arranged to first actuate valve 16 and then cable 81 of linkage means 27, upon movement of control lever 14 into one of its "run" positions. As shown in FIG. 3, this time delay is primarily set by a clearance "c", defined between each snubber means 84 and stop member 83. The time delay ensures that the control circuit is conditioned and charged with pressurized fluid, before pump 18 is stroked by linkage 30.

Furthermore, upon movement of spool 94 leftwardly, for example, from its centered, first position illustrated in FIG. 3, a first land 102 thereof will move through a distance "X" and a second land 103 thereof will move through a slightly greater distance "Y". This timed sequence will ensure that lines 65 and 66 are blocked before vent line 55 is closed so that there is no condition and position of control lever 14, when the engine is shut-down and thereafter restarted, wherein the vehicle will be allowed to move inadvertently.

Industrial Applicability

The control circuit illustrated in FIG. 1 finds particular application to hydrostatic transmission 23 which may be employed in a construction vehicle, such as a track-type tractor. Although the transmission is shown with a single pump 18 and a single motor 22 slaved thereto, it should be understood that normally a pair of each are employed on the vehicle.

Assuming that the engine of the vehicle is running to drive pump 11 and that control lever 14 is placed in its "vent" (V) position illustrated in FIGS. 1 and 3, pump pressure, as established by pressure regulating valve 39, will communicate with the inlet to venturi 31 to charge the control circuit with pressurized fluid. During this condition of operation, vehicle brakes 26 are held in an "on" condition of operation since line 48 communicates with tank 13, past land 58, formed on spool 52 of control and preconditioning valve means 17 (FIG. 2A).

Line 47, common to replenishing and relief valve 21 and brakes 26, will simultaneously communicate with tank 13 to vent this side of the valve. The parallel lines comprising loop 24 of hydrostatic transmission 23 are thus interconnected or "shunted" whereby the transmission is rendered non-operational in a conventional manner. It is further assumed that override pedal 32 has not been depressed to thereby maintain orifices 73 and 74 in closed conditions of operation.

The pressure differential or signal thus occasioned as between lines 34 and 35 will be communicated to opposite ends of underspeed actuator 28, via lines 37 and 36, respectively, to ready the control circuit for normal operation. Pressure regulating valve 39 will maintain a predetermined back pressure on the downstream side of venturi 31 (e.g., 350 psi) whereas pressure relief valve 46 will function to charge on side of replenishing and relief valve 21 with fluid maintained at a predetermined pressure (e.g., 150 psi). It should be further noted in FIG. 2A that lines 56 and 57 communicate to equalize the pressure on opposite sides of underspeed actuator 28, prior to shifting spool 71 leftwardly to its FIG. 2A position.

It should be noted in FIGS. 1 and 2A that pressurized fluid in line 49 will communicate with line 65 which, in turn, communicates with line 66, through first valve means 16. The pressure in line 66 will charge actuating chamber 67 of third valve means 60 to shift spool 59 thereof rightwardly to its FIG. 2A second position whereby passage 62 will communicate with passage 63 and also line 65. Restricted passage 68, formed in spool 59, and restricted orifice 70 are suitably sized to constantly retain sufficient fluid pressure in chamber 67 during the "vent" condition of operation to maintain spool 59 in its FIG. 2A position.

When the operator shifts control lever 14 into one of the two "run" positions (forward or reverse) illustrated in FIGS. 1 and 3, first valve means 16 will shift to its second position to block communication of line 65 with line 66 and to also block communication of line 55 with tank 13. Pressurized fluid will thus be communicated to line 55 from line 69 to pressurize the right end of second valve means 53 to move spool 58 thereof leftwardly to its second or operational position illustrated in FIG. 2B. Such positioning of spool 58 will block communication between lines 56 and 57 at land 71 thereof to render underspeed actuator 28 operational and also open communication between passage 63 and line 48, past land 58. Pressurized fluid will thus be communicated to replenishing and relief valve 21 and brakes 26 whereby hydrostatic transmission 23 is made operational to drive the vehicle and brakes 26 are released. The operator is now free to move control lever 14 between the minimum and maximum speed positions in the "run" portion of slot 15, subject to automatic control of servo-system 20 by underspeed actuator 28.

Should the operator desire to override the operation of underspeed actuator 28, he need only depress override pedal 32 (FIG. 1) whereby variable orifice 73 will open to connect lines 75 and 76 whereby the pressure differential normally communicated to opposite sides of the underspeed actuator may be selectively varied. Such an override condition of operation will continue throughout depression of pedal 32 through range "a" and control and preconditioning valve means 17 will remain in its operational condition illustrated in FIG. 2B.

However, should the operator depress pedal 32 further and into range "b" (FIG. 1), variable orifice 74 will open whereby line 55 will be vented to tank 13 and spring 54 will move spool 52 back to its first position, illustrated in FIG. 2A. Thus, replenishing and relief valve 21, as well as the actuating chambers of brakes 26, will be vented to tank 13 to stop the vehicle. However, since fluid pressure is being continuously supplied to actuating chamber 67, via restricted passage 68, valve spool 59 will remain in its FIG. 2A second position to continuously precondition control and preconditioning valve means 17 for subsequent operation. Upon release of pedal 32, orifices 73 and 74 will close whereby fluid pressure will again build-up in line 55 to shift spool 52 leftwardly whereby control and preconditioning valve means 17 will reassume its operational condition, illustrated in FIG. 2B.

Referring to FIG. 3, should the operator move control lever 14 into an "over-travel" range of actuation, stop member 83 will abut a snubber means 84 to depress pin member 87 thereof against a respective arm 85 or 86 whereby the operator will be alerted, by "feel", that this condition of operation has been reached. In particular, the operator will be alerted that servo-system 20, and thus pump 18 (FIG. 1), have been placed in their maximum displacement conditions of operation.

Other aspects, objects, and advantages of this invention can be obtained from a study of the drawings, the disclosure, and the appended claims.

We claim:

1. A control arrangement comprising
    a pivotal control member (79) having a pair of arms (85,86),
    a pivotal lever (80) disposed between said arms (85,86),
    a stop member (83) secured on said lever (80), and
    snubber means (84) for resiliently engaging said stop member (83) upon relative pivoting of said control member (79) and said lever (80), said snubber means (84) including a pin (87) reciprocally mounted on said control member (79) and biasing means (88) for biasing said pin (87) towards said stop member (83).

2. The control arrangement of claim 1 wherein a said snubber means (84) is mounted on an inner side of each arm (85,86) of said control member (79) for engagement with opposite sides of said stop member (83).

3. The control arrangement of claim 1 wherein said stop member (83) is normally spaced from said snubber means (84) to define an operating clearance (c) therebetween.

* * * * *